Patented Jan. 2, 1951

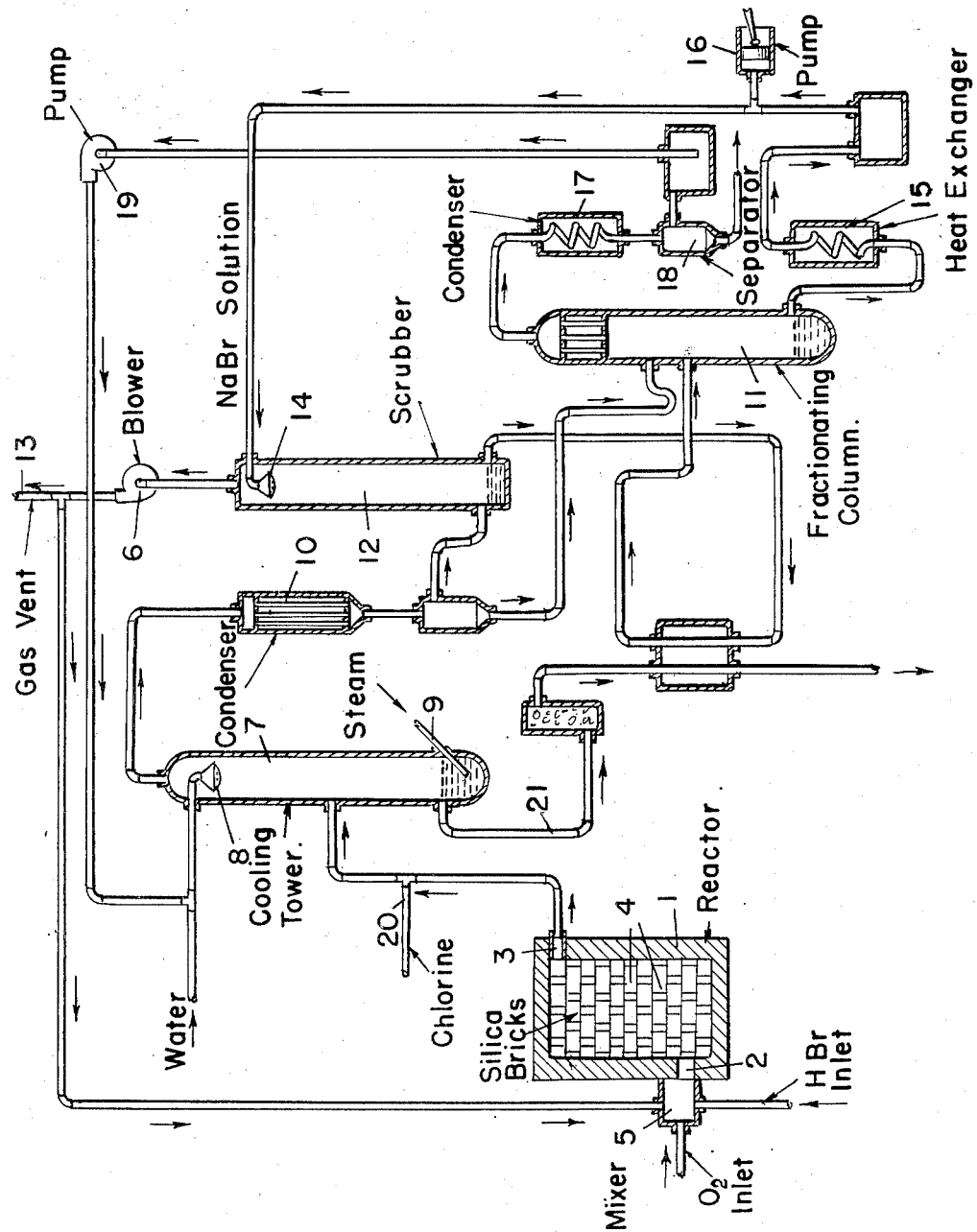

2,536,457

UNITED STATES PATENT OFFICE 2,536,457

RECOVERY OF BROMINE FROM HYDROGEN BROMIDE

Martin Mugdan, Richmond, England, assignor to The Distillers Company, Limited, Edinburgh, Scotland, a British company Application September 13, 1945, Serial No. 615,955 In Great Britain August 29, 1944

Section 1, Public Law 690, August 8, 1946 Patent expires August 29, 1964

9 Claims. (Cl. 23—216)

The recovery of bromine from hydrogen bromide, for example the hydrogen bromide formed in the bromine substitution of organic compounds, is an important problem and is economically very desirable. The oxidation of hydrogen bromide by means of oxygen would appear to be a simple and convenient method but unfortunately there is no known way in which this reaction can be carried out on an industrial scale.

In United States patent specification No. 2,163,877 a process is described which comprises passing a mixture of hydrogen bromide and an excess of an oxygen-containing gas over a catalyst at temperatures of 300°–700° preferably 325° C. to 425° C. it being stated that there is no advantage to be gained by the use of temperatures above about 400° C.; high yields can indeed be obtained by operating this process in small scale experiments, but it cannot be used on an industrial scale because of the highly exothermic nature of the reaction, as shown by the following formula:

$$4HBr + O_2 = 2Br_2 + 2H_2O + 66,000 \text{ cal.}$$

Great difficulties would be met with in maintaining the stated temperatures by the removal of such a large quantity of heat from large reaction chambers which have to be built of ceramic materials because of the highly corrosive action of the reactants and, of course, such materials have a low coefficient of thermal conductivity. In the absence of cooling, the temperature would rise by about 1000° C. if the reaction were to be carried out with dry hydrogen bromide and using the small excess of air described in the specification. If pure oxygen were to be used instead of air, the temperature would be still higher but for the large shift of the equilibrium. To keep the temperature down to 400° C. as proposed in the specification 18 times the stoichiometrical quantity of oxygen, or a similar excess of another gas, would be needed to absorb the heat of reaction in large scale working. To isolate the volatile bromine from such a large volume of gas would be very difficult and would lead to considerable losses. Preheating the reactants, as in the example of the specification, would but increase these difficulties which are completely overlooked in the prior specification.

An object of the present invention is to provide a new procedure in which these difficulties are overcome, and in addition a much higher speed of reaction is obtained than was possible before.

The previous work on this reaction was apparently governed by the assumption that in this reaction, as in the analagous reaction with hydrogen chloride (Deacon's process), the temperature has to be kept down as much as possible because the equilibrium would be shifted in favour of the reverse reaction by rising temperatures. Indeed, in Deacon's process theoretically not more than 80% conversion can be obtained at 400° C. even in the presence of a large excess of oxygen. The use of low temperatures seemed, furthermore, necessary because the most effective catalysts, copper halides, lose their activity in consequence of their low melting point and their volatility. I have found that, for the oxidation of hydrogen bromide, this apprehension about the effect of higher temperatures is unfounded and that it is possible to oxidise hydrogen bromide with an excess of oxygen or air with a good yield and with a high speed, if much higher temperatures are used than before. 800°–1200° C.—preferably 800°–1000° C. has proved a useful range. Cerium compounds are suitable catalysts in this temperature range, but above 900° C. the reaction velocity is so large that even in an empty silica tube a high yield is obtained at 980° C. Moreover, below 1100° C. no substantial influence due to the shift of the equilibrium is perceptible.

According to the present invention, there is provided a process for the recovery of bromine from hydrogen bromide by oxidation thereof comprising passing a mixture of hydrogen bromide with oxygen or an oxygen-containing gas through a reactor at a temperature of 800° to 1200° C., preferably 800° to 1000° C., the ratio of oxygen to hydrogen bromide being more than one to four; preferably the excess of oxygen or oxygen-containing gas used is sufficient to absorb the heat of reaction so as to maintain the desired temperature without the necessity of heating or cooling the reactor.

A feature of the invention consists in that the reactants are passed over a catalyst, preferably cerium oxide, which may conveniently be supported upon pumice granules or other refractory materials.

A further feature of the invention consists in that where any considerable quantity of water vapour is present in the reactor, the reaction temperature is maintained by the addition to the reactants of a combustible gas, preferably hydrogen.

A particular advantage, afforded by the use of the high reaction temperatures, is the possibility of removing the reaction heat in an easy way.

At 1000° C. an excess of about 4 to 5 times the stoichiometrical oxygen, or the equal amount of an indifferent gas—such as is present in air—is needed to achieve that effect. The produced bromine has to be condensed out of a mixture of one volume of bromine to two volumes of oxygen whereas if a temperature of 400° C. had to be maintained, the mixture would be in the ratio of one volume of bromine to nine volumes of oxygen.

If a mixture of four volumes of hydrogen bromide with one volume of oxygen is passed through an empty, transparent silica tube at a temperature above red heat, a luminescence becomes visible at 650°–700° C. which incidates the commencement of the reaction. This flame burns more brightly at higher temperatures.

The table contains the results of experiments made at temperatures between 700° and 1000° C. A silica tube of half-an-inch internal diameter was used as the reactor and was heated in an oven. The temperature was measured by a thermocouple placed in a narrow silica tube inserted within the reactor immediately after the reaction zone; the reactor was, in some experiments, filled with pumice granules (mesh 4–8) impregnated with 10% by weight of cerium oxide. The last two columns of the table indicate the time of contact of the hydrogen bromide with the catalyst or with the hot wall of the empty reactor, and the yield of bromide in proportion to the hydrogen bromide.

of oxygen necessary for the oxidation of the hydrogen bromide. Using the vapours from such an acid, instead of the dry hydrogen bromide, and twice as much oxygen as the stoichiometrical amount at 750° C. in contact with the cerium oxide-pumice catalyts, 74% yield was obtained with a contact time of one second. This is by no means an unsatisfactory result, but such a large excess of steam would not allow the maintenance of the temperature in a thermally-insulated reactor because of its cooling effect. This cooling effect can, in part, be made up for by heat exchanging or it can be fully compensated for by admixing a combustible gas, preferably hydrogen, and additional oxygen to the reacting gases.

The following is a description with reference to the accompanying diagrammatic drawing of the manner in which the invention may be carried into effect on a commercial scale:

A reactor 1 formed of a ceramic material, preferably of silica bricks, and provided with an inlet 2 and outlet 3 at opposite ends is filled with silica bricks 4 which have been impregated with a catalyst, such as cerium oxide. The reactor is heated by a combustible gas to a temperature above 600° C. Through a mixer 5, connected to the reactor inlet, hydrogen bromide gas and oxygen in the volume proportion of 4:1 are supplied to the reactor. Simultaneously additional oxygen, in an amount of about five times the amount introduced through the mixer, is

| Experiment | Temp., °C. | Litres of HBr (calc. at 20° C.) per hour per litre of reaction space | Ratio of oxygen to HBr by volume | Catalyst and other conditions | Contact time in sec. | Br, yield per pass, percent |
|---|---|---|---|---|---|---|
| 1 | 720 | 500 | 0.5 | $CeO_2$ on pumice | 1.4 | 92 |
| 2 | 730 | 600 | 0.45 | Empty tube | 1.2 | 27.6 |
| 3 | 910 | 600 | 0.55 | $CeO_2$ on pumice | 0.94 | 92 |
| 4 | 900 | 600 | 0.77 | Empty tube | 0.84 | 71.5 |
| 5 | 980 | 600 | 0.3 | do | 1.1 | 90 |
| 6 | 972 | 600 | 0.33 | Quartz chips | 1.1 | 89 |
| 7 | 985 | 600 | 1.4 | Empty tube | 0.5 | 95 |
| 8 | 993 | 600 | 1.7 | do | 0.5 | 98.2 |
| 9 | 1,000 | 450 | 0.33 | $CeO_2$ on pumice and Air | 0.6 | 87.5 |

It will be noted that at 980° C. the yield in the empty tube increased to 90% in spite of the oxygen excess being low. Filling the reactor with silica chips did not substantially alter the result.

The effect of such excesses of oxygen as would approximate to those to be used for maintaining a reaction temperature of about 1000° C. in a thermally-insulated reactor can be seen from the results of experiments 7 and 8 which show that in the absence of a catalyst 95% and more yield was obtained with a contact time of half a second. In most of the experiments made above 900° C., the duration of the passage of the reactants through the hot zone was less than 1 second, as contrasted with the contact time of 5 to 10 seconds stated to be needed at a temperature of 350° C. and 18 seconds at 400 to 410° C. in the United States patent specification No. 2,163,877 already referred to.

In experiment 9 a catalyst and air were used instead of oxygen and no catalyst. The oxygen excess was only one-third and the time of contact was only 0.6 second but in spite of this, a yield of nearly 90% was obtained at 1000° C.

Water vapour could be used as a cooling medium, but in contrast to the use of an oxygen excess it has an unfavourable effect on the equilibrium at the high temperatures. The constant-boiling aqueous hydrobromic acid solution contains about 5 mols of water to each mol of HBr so that there would be 20 mols of water to each mol recycled into the mixer by means of a blower 6, the delivery of which is regulated so that the temperature in the reactor is about 1000° C. The gases leaving the reactor 1 are introduced into the centre of a cooling tower 7 and are cooled down by water supplied to a jet or sprayer 8 trickling down from the top of the tower while some steam is injected through the pipe 9 at the bottom of the tower to prevent any loss of bromine with the waste water leaving the base of the tower. The mixture of bromine, oxygen and steam escaping from the top of the tower passes through a condenser 10. Some liquefied bromine, together with the bromine-water, flows from the condenser 10 directly into a fractionating column 11, while the gaseous bromine-oxygen mixture passes to the bottom of a scrubber 12 where the bromine is washed out with a solvent, for instance with a concentrated solution of sodium bromide in water, introduced through the jet or sprayer 14. The oxygen passing out of the scrubber 12, which may still contain some bromine, is recycled by the blower 6 to the mixer 5, where the mixture of hydrogen bromide and oxygen is continuously introduced, the oxygen excess passing continuously through the circuit of the reactor 1, cooling tower 7, condenser 10, scrubber 12 and blower 6.

Any indifferent gas in the cycle may be vented at the point 13 in the pipe between the blower 6 and the mixer 5.

The bromine-containing liquids leaving the base of the scrubber 12 are fractionated in the column 11, from the bottom of which the extracting liquid, for instance a sodium bromide solution, is withdrawn, cooled in the heat exchanger 15 and recycled to the top of the scrubber 12 by the pump 16. Bromine vapour and steam are conveyed to a condenser 17 and thence to a separator 18 from which the bromine and bromine water are separately recovered, the latter being recycled by the pump 19 to the cooling tower 7 where it is mixed with the water input to the jet or sprayer 8.

Some hydrogen bromide may escape unaltered from the reactor. It is best transformed into bromine by adding the equivalent quantity of chlorine to the hot gases issuing from the reactor, conveniently at a point 20 near to the outlet from the reactor, to displace the bromine from the hydrogen bromide. The hydrochloric acid so formed is removed with the waste liquid from the cooling tower passing out through the effluent pipe 21.

What I claim is:

1. A process for the recovery of bromine from hydrogen bromide by oxidation thereof, which comprises the step of passing a mixture of hydrogen bromide and an oxygen-containing gas through a reactor at a temperature of 800° C. to 1200° C., the ratio of oxygen to hydrogen bromide in the said mixture being more than 1:4 by volume and the contact period in the reactor at the said temperature being approximately from 0.5 to 1.4 seconds.

2. A process for the recovery of bromine from hydrogen bromide by oxidation thereof, which comprises the step of passing a mixture consisting of hydrogen bromide and molecular oxygen through a reactor at a temperature of 800° C. to 1000° C., the ratio of oxygen to hydrogen bromide in the said mixture being more than 1:4 by volume and the contact period in the reactor at the said temperature being approximately from 0.5 to 1.4 seconds.

3. A process according to claim 1, wherein the said mixture contains such an excess of the oxygen-containing gas as will absorb sufficient of the heat of the reaction to maintain the reactor automatically at the desired reaction temperature.

4. A process for the recovery of bromine from hydrogen bromide by oxidation thereof, which comprises the step of passing a mixture of air and hydrogen bromide through a reactor at a temperature of 800° C. to 1200° C., the ratio of oxygen to hydrogen bromide in the said mixture being more than 1:4 by volume and the contact period in the reactor at the said temperature being approximately from 0.5 to 1.4 seconds.

5. A process for the recovery of bromine from hydrogen bromide by oxidation thereof, which comprises the step of passing a mixture of hydrogen bromide and an oxygen-containing gas through a reactor in the presence of cerium oxide as oxidation catalyst at a temperature of 800° C. to 1000° C., the ratio of oxygen to hydrogen bromide in the said mixture being more than 1:4 by volume and the contact period in the reactor at the said temperature being approximately from 0.5 to 1.4 seconds.

6. A process for the recovery of bromine from hydrogen bromide by oxidation thereof, which comprises the steps of passing a mixture of hydrogen bromide, water vapour and molecular oxygen through a reactor at a temperature of 800° C. to 1000° C., the ratio of oxygen to hydrogen bromide in the said mixture being more than 1:4 by volume and the contact period in the reactor at the said temperature being approximately from 0.5 to 1.4 seconds, and introducing into the reactor a combustible gas in an amount sufficient to maintain the desired reaction temperature but insufficient to reduce the ratio of oxygen to hydrogen bromide to a value below 1:4 by volume.

7. A process for the recovery of bromine from hydrogen bromide by oxidation thereof, which comprises the steps of passing a mixture of hydrogen bromide, water vapour and molecular oxygen through a reactor at a temperature of 800° C. to 1000° C., the ratio of oxygen to hydrogen bromide in the said mixture being more than 1:4 by volume and the contact period in the reactor at the said temperature being approximately from 0.5 to 1.4 seconds, and introducing into the reactor hydrogen in an amount sufficient to maintain the desired reaction temperature but insufficient to reduce the ratio of oxygen to hydrogen bromide to a value below 1:4 by volume.

8. A process for the recovery of bromine from hydrogen bromide by oxidation thereof, which comprises feeding a mixture of hydrogen bromide and oxygen in a ratio of less than 1:4 by volume into a reactor, contacting the gases in the reactor for a period of approximately 0.5 to 1.4 seconds, maintaining a temperature within the reactor of between 800° C. and 1000° C., withdrawing the effluent gases from the reactor, cooling the said effluent gases to condense bromine therefrom, scrubbing the effluent gases with a solvent for bromine, recycling at least a part of the scrubbed effluent gases to the reactor, and distilling and recovering the bromine dissolved in said solvent.

9. A process for the recovery of bromine from hydrogen bromide by oxidation thereof, which comprises the step of passing a mixture of hydrogen bromide and an oxygen-containing gas through a reactor at a temperature of 800° C. to 1200° C. in the absence of a catalyst, the ratio of oxygen to hydrogen bromide in the said mixture being more than 1:4 by volume and the contact period in the reactor at the said temperature being approximately from 0.5 to 1.4 seconds.

MARTIN MUGDAN.

REFERENCES CITED

The following references are of record in the file of this patent:

UNITED STATES PATENTS

| Number | Name | Date |
|---|---|---|
| 714,160 | Dow | Nov. 25, 1902 |
| 881,806 | Kubierschky | Mar. 10, 1908 |
| 2,163,877 | Hooker | June 27, 1939 |
| 2,204,172 | Balcar | June 11, 1940 |

FOREIGN PATENTS

| Number | Country | Date |
|---|---|---|
| 382,512 | Great Britain | Oct. 27, 1932 |